United States Patent
Harrelson, Jr.

[11] 3,993,521
[45] Nov. 23, 1976

[54] LUGGED VEHICLE TIRE, AND METHOD OF BUILDING SAME

[75] Inventor: Albert A. Harrelson, Jr., Asheboro, N.C.

[73] Assignee: Harrelson Rubber Company, Asheboro, N.C.

[22] Filed: July 23, 1975

[21] Appl. No.: 598,358

Related U.S. Application Data

[60] Division of Ser. No. 509,793, Sept. 27, 1974, Pat. No. 3,945,417, which is a continuation-in-part of Ser. No. 449,917, March 11, 1974, abandoned, which is a continuation-in-part of Ser. No. 366,101, June 1, 1973, abandoned.

[52] U.S. Cl. ............................... 156/96; 156/128 R
[51] Int. Cl.² ................... B29H 17/37; B29H 17/40
[58] Field of Search ................... 156/94, 95, 96, 98, 156/110 R, 123 R, 128 R, 129; 152/209 B, 330

[56] References Cited
UNITED STATES PATENTS

| | | |
|---|---|---|
| 2,474,013 | 6/1949 | Rawls .............................. 152/209 B |
| 2,611,411 | 9/1952 | Rawls .............................. 152/209 B |
| 2,976,910 | 3/1961 | Nowak ................................. 156/96 |
| 3,136,673 | 6/1964 | Carver ................................. 156/96 |
| 3,511,291 | 5/1970 | Ragan ............................. 152/209 B |
| 3,745,084 | 7/1973 | Schelkmann .......................... 156/96 |

*Primary Examiner*—William A. Powell
*Assistant Examiner*—John E. Kittle
*Attorney, Agent, or Firm*—Joseph H. Heard

[57] ABSTRACT

The tire comprises a preformed carcass having a plurality of precured lugs secured to its circumferential surface by a thick layer-like mass of readily cured cushion gum material. The carcass may be of new construction but would usually be obtained by buffing the circumferential surface of a used and worn lugged tire to render the same substantially smooth and even. The lugs are separately formed by simultaneously molding and precuring retread rubber under high pressure and uniformly-applied heat, so as to possess high strength, density and cut and abrasion-resistance. The carcass, cushion gum and lugs are cemented and stitched together at ambient temperature and in a manner minimizing oxidation at their confronting surfaces. When the circumferential surface of the tire carcass to which the lugs are secured possesses a significant curvature in the width direction thereof, the exterior surfaces of the lugs may be and preferably are provided with stress-relieving grooves in their outer surfaces. The aforesaid assembly is then heated within a steam chamber under differential-pressure conditions for only the limited time necessary to vulcanize the cushion gum material and thereby permanently unite the components.

19 Claims, 8 Drawing Figures

LUGGED VEHICLE TIRE, AND METHOD OF BUILDING SAME

BACKGROUND OF THE INVENTION

This application is a division of application Ser. No. 509,793, filed Sept. 27, 1974, and issued Mar. 23, 1976, as U.S. Pat. No. 3,945,417 which was a continuation-in-part of application Ser. No. 449,917, filed Mar. 11, 1974, and now abandoned; which was a continuation-in-part of application Ser. No. 366,101, filed June 1, 1973 and now abandoned.

This invention relates to vehicle tires of the lugged type, and more specifically relates to an improved lugged tire and to a method for its formation, which method is particularly but not necessarily exclusively adapted for the rebuilding of used lugged tires.

In addition to other utilizations, lugged tires are customarily employed upon many kinds of tractors, earth-moving machines and other off-the-road vehicles. Such tires are manufactured in a wide variety of frequently extrememly large sizes, and the projecting lug portions thereof are subjected during use to not only severe abrasive and compressive forces, but also to shearing forces of very high magnitude. The useful life of the tires, as heretofore built, has tended to be relatively short. Attempts to salvage worn lugged tires by rebuilding the same have not solved the durability problem, and have met with other difficulties as well.

The rebuilding of lugged tires in the traditional manner, by vulcanizing and shaping a "camelback" of retread rubber material in situ upon the buffed carcass, requires a substantial capital investment in large molds and materials of various sizes, and also possesses other disadvantages heretofore recognized in the art. The fabrication and precuring of camelback material would still require a large capital investment in molds and/or materials, since each such camelback could be used for only a tire of one particular size, and the difference in size between the relatively massive lug portions and the remaining portions of the material would make undercuring of the former or overcuring of the latter, with resulting detrimental effects in either case, hightly likely. Alternative approaches to the problem of rebuilding lugged tires are disclosed in Rawls U.S. Pat. Nos. 2,474,013 and 2,611,411, and Ragan U.S. Pat. Nos. 3,511,291 and Re. 27006. In accordance with the Rawls approach; discrete replacement lugs formed in special shapes of uncured rubber are temporarily secured to the worn and buffed lugs of the used tire by a thin coating of cushion gum material and stitching. The assembly is then heated within a stream chamber to vulcanize both the uncured lugs and the cushion gum material and to unite the components. Although also employing discrete replacement lugs, the Ragan patents state that the use of cushion gum material in a relugged heavy-duty tire produces a "weak join" which will result in separation of the added lugs from the tire carcass under the high stresses imposed thereon during use. The Ragan patents therefore alternatively teach the rebuilding of a lugged tire, totally devoid of cushion gum material, by temporarily securing a sheet of uncured retread rubber to the buffed crown surface of the tire carcass, then temporarily securing extruded lugs of the same uncured retread rubber material to the aforesaid sheet, and thereafter heating the assembly in a stream chamber for the length of time required to vulcanize the uncured retread rubber material of both the sheet and the extruded lugs. The aforesaid approach is believed to have certain inherent disadvantages. To obtain satisfactory adherence between the retread rubber material of the sheet and of the replacement lugs, such material normally must be in a heated condition during the assembly operation. In addition to impeding their handling, this requires either that the components be assembled immediately after their formation, while they still retain the heat imparted to them during such formation, or that they be subsequently re-heated. Secondly, since the final vulcanization step must produce curing of both the sheet of uncured rubber material and the lugs of the same uncured rubber material, and such material is relatively massive and cures at only the customary relatively slow rate, the final vulcanization of the assembly requires considerable time to effect. This, in turn, severely restricts production, or requires the provision of a large number of expensive heating chambers. Additionally, undercuring of the lugs or overcuring of the sheet and heat-deterioration of the tire carcass may well result. Thirdly, the replacement lugs cured in situ upon the used tire have significantly less density, strength and cut and abrasion-resistance than would lugs which were precured under conditions of high pressure and more even application of heat. A rebuilt tire wherein the lugs are cured in situ upon the carcass therefore possesses at best only the limited durability of the original tire, and is also subject to possible premature failure arising from the prolonged reheating of the carcass.

SUMMARY OF THE INVENTION

The lugged tire of the present invention may be formed by utilizing a new tire carcass having a substantially smooth outer circumference or, as would more normally be the case, by employing the carcass of a used lugged tire and rendering its circumferential surface substantially smooth by grinding and/or buffing operations. In either case, there are provided a plurality of lug components which have at any convenient prior time and place been formed by simultaneously molding and curing retread rubber in a mold under high pressure and subtantially uniformly applied heat. Relatively thick layers of cushion gum material capable of rapid curing and having good flexibility both before and after curing are secured upon the prepared circumference of the tire carcass, and upon the base surfaces of the precured lugs. The precured lugs bearing base layers of cushion gum material are then secured to the cushion gum layer upon the carcass circumference. Each of the foregoing assembly steps are preferably performed by cementing and stitching procedures carried out while the components are unheated and their confronting faces are substantially free of surface oxidation. If the circumferential surface of the tire carcass employed in the assembly has substantial curvature in its width direction, the precured lugs thereon are preferably provided one or more transversely extending grooves within their outer surfaces, which groove or grooves tend to relieve the stresses which might otherwise be present within the lugs due to their forced-conformity to the curvature of the circumference of the tire carcass. Each such groove may conveniently be formed by engaging the exterior surface of the lug-carcass assembly with a heated grooving iron or similar tool while rotating the assembly about its axis. Following the aforesaid assembly operations, and the grooving step if such is performed, the entire assembly is placed within a steam chamber wherein a differential external-internal pressure is maintained thereon and wherein the assembly is heated for only the relatively brief period of time necessary to vulcanize the cushion gum material and therby permanently unite all components. Since the time required for vulcanization of the cushion gum material is considerably less than the time which would be required for vulcanization if such material and/or the lug components were formed of uncured retread rubber, heat-deterioration of the carcass component is avoided and good operational efficiency and economy are realized. Also noteworthy in the latter regards is the fact that the various components need not be assembled immediately after their formation or be in a heated condition when secured to one another. This not only simplifies and facilitates assembly of the components, but moreover permits the lug components (as well as the cushion gum material) to be wholly or partially formed in advance, and then held in inventory until needed. To minimize the amount of inventory required for a small tire rebuilder to practice the invention, the retread rubber may be and preferably is molded into elongated bars having the desired cross-sectional shape and from which lugs of the particular length required for the building or rebuilding of a specific tire may thereafter be severed during or at any convenient time prior to their use. The precuring of the retread rubber which occurs during molding of the elongate bar is carried out at high pressure in a mold capable of applying heat substantially uniformly to the material therewithin, so as to impart high high strength, density and cut and abrasion-resistence to the retread rubber of the precured lugs.

The lugged tire of the present invention comprises quite dense, strong wear-resistant precured lugs which are bonded to the substantially smooth circumferential surface of a new or used tire carcass by a relatively thick layer-like mass, as opposed to a thin coating or sheet, of flexible cushion gum material. In the latter connection, the layer-like mass of cushion gum material upon the finished tire has a minimum thickness of at least approximately ⅜ to ½ inch and may be greater when the lug thickness is in excess of 3½ inches, as opposed to the 1/16 inch thick sheet of cushion gum material customarily employed in association with the rebuilding of non-lugged tires. When an interconnecting cushion gum mass of the aforesaid thickness is employed, the lug components of the present tire do not tend to be torn away from the carcass by the high shear and other forces imposed thereon during use of the tire, notwithstanding the fact that the surface bonding characteristics of the thick mass of material are no greater per se than would be possessed by a thin coating of the same material. While the reasons for this benefical result are not definitely known, apparently the thick mass of cushion gum material permits some deflection of the lugs under the impetus of the shearing forces exerted thereon, and/or itself absorbs or dissiplates an apppreciable part of such forces rather than transmitting all of them to the relatively-weaker material of the tire carcass.

In any event, the aforesaid attributes in conjunction with the high strength, density and general wear-resistance of the precured lugs constituting its primary ground-engaging components, cause the tire of the present invention to be exceedingly durable in use. A lugged constructed in accordance with the invention possesses a useful lift approximately twice as great as that of lugged tires heretofore employed, which consideration is particularly significant in view of the fact that tires of the type in question can normally be rebuilt only a single time before they must be discarded.

DESCRIPTION OF THE DRAWINGS

Other features and benefits of the invention will be in part apparent and in part pointed out hereinafter in the following description of illustrative embodiments thereof, which should be read in conjunction with the accompanying drawings, in which.

DESCRIPTION OF THE PREFERRED EMBODIMENTS

Figure 1:
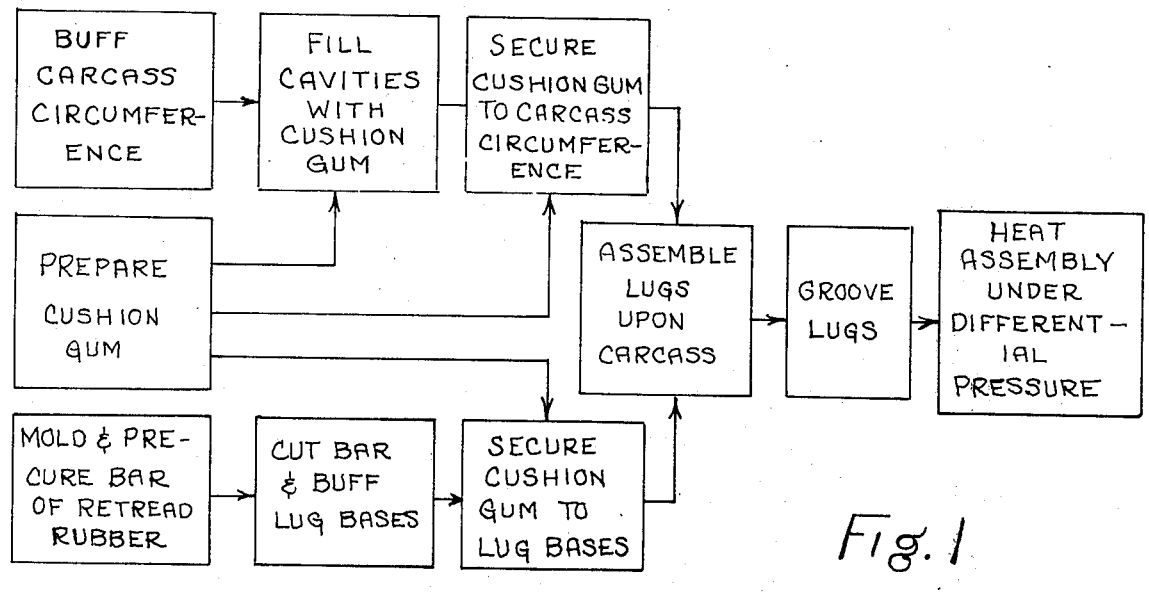
FIG. 1 is a diagrammatic representation of a method of forming a lugged tire illustratively employing a used tire carcass, in accordance with the invention.
Figure 2:
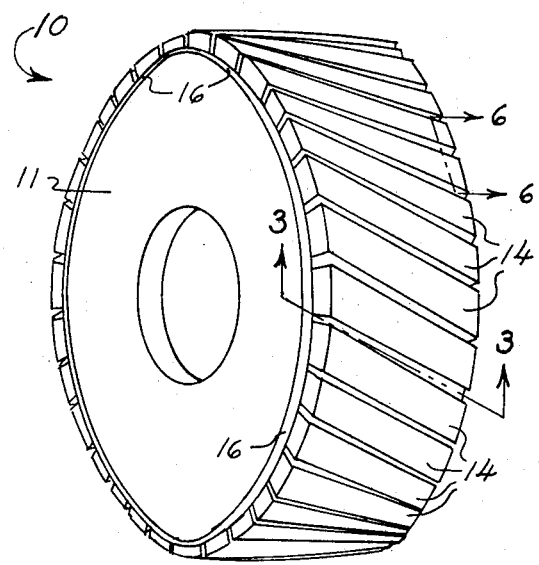
FIG. 2 is a perspective view of a lugged tire constructed in accordance with the present invention.
Figure 3:
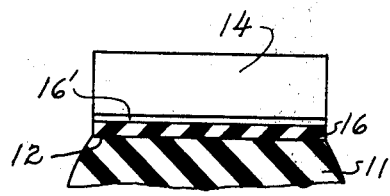
FIG. 3 is an enlarged fragmentary view, partially in section and partially in elevation, taken generally along the line 3—3 through the tire of FIG. 2.
Figure 7:
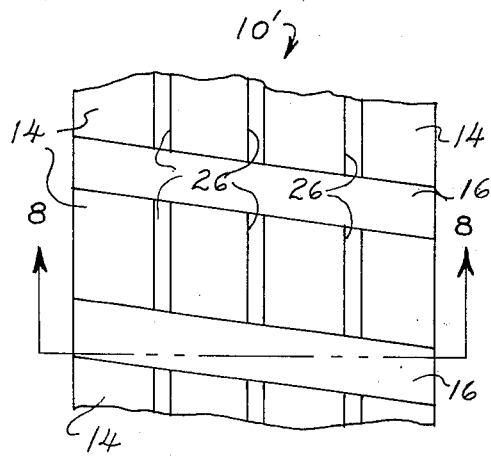
FIG. 7 is a fragmentary elevational view of a lugged tire constructed in accordance with the invention and employing a carcass having its circumference curved in the width direction.
Figure 8:
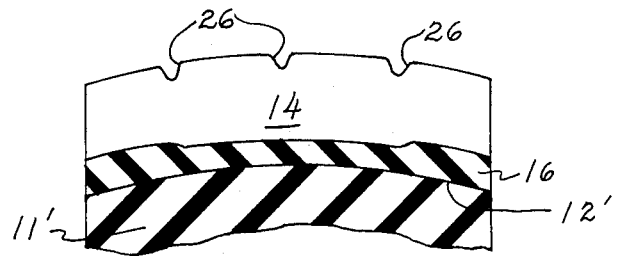
FIG. 8 is a fragmentary view, partially in section and partially in elevation, taken substantially along line 8—8 through the tire of FIG. 7.

Referring more particularly to the drawings, the tire-building method diagrammatically illustrated in FIG. 1 generally comprises preparing highly durable lug components formed of precured retread rubber material; providing a new or used tire carcass having a buffed and substantially smooth circumferential surface; securing upon the circumference of the tire carcass and upon the buffed bases of the precured lugs relatively thick layers of tacky and readily-curable cushion gum material; assembling together the precured lugs and tire carcass having thereon the aforesaid layers of cushion gum material; grooving, in some instances, the outer surfaces of the lug components of the assembly; and thereafter placing the assembly in a steam chamber wherein a differential external-internal pressure is imposed thereon and wherein the assembly is heated for only the limited period of time required to vulcanize the cushion gum layers and thereby permanently unite the components. A lugged tire 10 constructed in accordance with the invention generally comprises, as shown in FIGS. 2 and 3, a conventional tire carcass 11 having a substantially smooth circumferential surface 12 upon which a plurality of discrete and highly wear-resistant lugs 14, each fomred of precured retread rubber material 14', are permanently secured by means of a thick intervening layer-like body or mass 16 of relatively soft and flexible cushion gum material 16'. The cushion gum mass 16 extends about the full length and width of the circumference 12 of tire carcass 10 and has a minimum thickness, preferably no less than ⅜ to ½ inch at any point, sufficient to dissipate a significant part of the shearing forces imposed upon lugs 14 during one of the tire. Cushion gum material 16' is readily curable such that the curing in situ of the mass 16 thereof upon carcass 11 can be and is rapidly effected without deterioration of or detriment to the tire carcass. As is indicated in FIGS. 7 and 8, when a lugged tire 10' is formed from a carcass 11' having a circumferential surface 12' which is curved in a lateral direction, rather than being substantially flat as in the case of the carcass 11 of FIGS. 2 and 3, one or more stress-relieving and transversely-extending grooves 26 are provided within the outer surfaces of lug components 14.

Cushion gum material 16' and retread rubber material 14' are preferably and respectively comprised primarily of natural rubber of very high grade quality, such as that classified in the industry as Grade A, and of synthetic rubber, mixed in each case with additives such as fillers, vulcanizers, accelerators, anti-oxidants and the like to produce or enhance desired characteristics or properties in the respective materials. The desired properties possessed by cushion gum material 16' include particularly high tackiness, excellent bonding ability and a rapid curing rate. Cushion gum material 16' also possesses good flexibility before and after curing, and may be relatively soft, a Durometer hardness of approximately 60–61 being acceptable therefor after curing. The lug components 14 formed of retread rubber material 14' may be and preferably are somewhat harder than the cured cushion gum material 16', a Durometer hardness of approximately 64 or 65 being acceptable therefor, and possess significantly greater density and cut and abrasion-resistance. The excellence of the aforesaid properties of lugs 14 is due not only to the composition of the retread rubber material 14' from which they are formed, but also in more significant part to the manner in which such material is cured.

Figure 4:
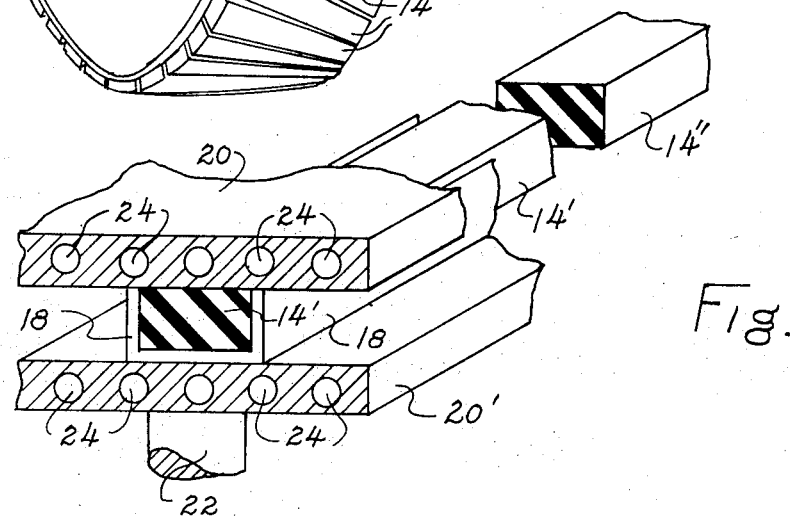
FIG. 4 is a fragmentary perspective view, partially schematic and in vertical section, of a mold for simultaneously molding and precuring the retread rubber of the lug components employed in the method and tire of the invention.

Thus, as is diagrammatically shown in FIG. 4, lugs 14 are preferably formed by molding retread rubber material 14' in a mold 18 having a cross-sectional shape, customarily generally rectangular (which term is intended to include trapozoidal) as shown, corresponding to the desired cross-sectional shape of the lugs 14. Mold 18 has an open top through which material may be inserted therein an dremoved therefrom, and preferably has a length many times greater than the length of a single lug 14. Mold 18 is received between upper and lower platens 20,20' of a suitable press having a length equal to or greater than that of the mold and a width preferably sufficient for a plurality of molds to be positioned therein in side-by-side relationship to one another, if desired. One of the press platens, illustratively lower platen 20°, is verically movable toward and away from the upper platen as by a ram 22, and both platens are heated as by passage of steam or the like through suitable conduits 24 provided therein. Prior to the commencement of a molding operation, platens 20,20' and mold 18 are preheated by passing steam through conduits 24 while the empty mold, which is formed of heat conductive metal, is disposed between the platens. Following preheating of mold 18, the same is overfilled through its open top with retread rubber material 14', and platen 20– is moved by ram 22 toward platen 20 so as to subject material 14' to curing under high pressure and substantially uniformly applied heat. In the latter regard, it will be appreciated that heat is not only transmitted to material 14' from the upper platen 20 is direct engagement with its upper surface, but also is transmitted from both platens to the side and base surfaces of the material through the heat-conductive mold 18. Material 14' remains within mold 18, under a pressure preferably within the approximate range 700 psi to 800 psi and a temperature preferably in the approximate range of 300° F to 350° F, until such material is fully and uniformly cured and has permanently assumed the shape of an elongate bar, a fragmentary length of which is indicated by the numeral 14'' in FIG. 4, of the desired cross-sectional shape of the lugs 14 to be subsequently formed therefrom. The required curing time will of course vary in accordance with, among other things, the precise temperature and pressure employed, and the particular cross-sectional dimensions of the bar 14'' which is formed. In the illustrative case of a bar having a width of approximately 4½ inches and a thickness of approximately 2½ inches, however, curing for approximately 1 hour at a temperature of 325° F and a pressure of 750 psi is acceptable. When molded and cured under the aforesaid conditions of high pressure and uniformly applied heat, the elongate bar 14'' pressure and uniformly applied heat, the elongate heat 14'' possesses a more uniform density and markedly greater cut and abrasion-resistance that would be possessed by curing retread rubber material in situ upon a tire carcass within a steam chamber. Additionally, the curing process may be and is effected relatively rapidly, and without overcuring or undercuring of any part of the material.

Figure 5:
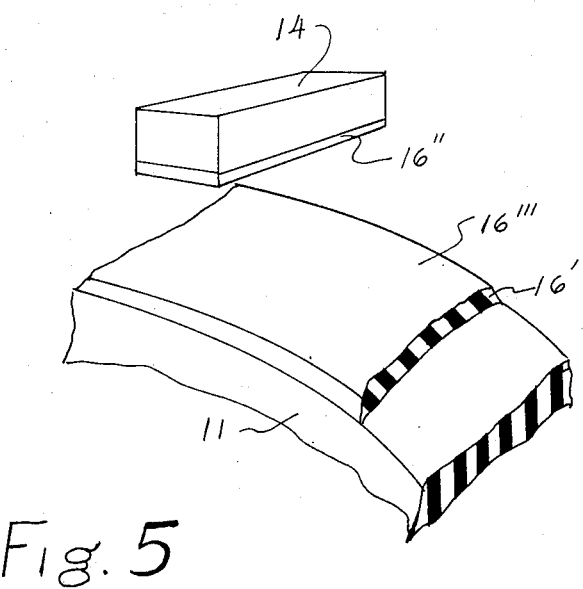
FIG. 5 is an enlarged fragmentary perspective view, partially broken away, of a lug and the carcass prior to their assembly with one another but subsequent to the provision of layers of cushion gum material thereon.

After each elongate bar 14'' of precured rubber material has been removed from its mold 18 and allowed to cool, it may be immediately severed at spaced locations along its length to form therefrom a plurality of discrete lugs 14, to the base surface of which a layer 16'' (FIG. 5) of cushion gum material 16' may then be secured. Preferably, however, each elongate bar 14'' is simply placed in inventory at the location where it is to be subsequently used in tire building or rebuilding operations. This alternative is deemed preferable since it enables lugs 14 to be cut to the proper length for the building or rebuilding of any particular one of a plurality of tires of different widths, and thereby reduces the amount of materials which must be inventoried in order to construct lugged tires of various sizes. Additionally, while the bars 14'' and lugs 14 of precured retread rubber material have a practically indefinite storage or "shelf" life, the readily-curable cushion gun material 16' may commence detrimental self-curing after approximately 90 days, even at ambient temperatures. Preferably, therefore, cushion gum material 16' is not held in inventory for longer than approximately 90 days before use thereof. At such time as cushion gum material 16 is assembled with lugs 14, the bases of the latter are first buffed or otherwise abraded to removed surface oxidation therefrom and to slightly roughen the almost mirror-like finish produced thereon by the molding process used in their formation. Layers 16'' of cushion gum material 16' are then promptly applied to the lug bases by cementing and stitching techniques. The thickness of the cushion gum layer (FIG. 5) secured to the base of each lug 14 is preferably appproximately 3/32 inch. A removable covering of cellophane film or the like is applied to the bottom of the cushion gum layer 16'' upon each lug 14, to prevent oxidation thereof, unless the lug is to be immediately used in a tire building or rebuilding operation.

When the tire 10 incorporates a used carcass 11, the circumferential surface 12 of the used carcass is first buffed or milled, as by use of an apparatus such as disclosed in U.S. Pat. No. 3,646,984, to remove therefrom any contaminated surface rubber and remnants of the worn original lugs thereon, and so as to render such surface substantially smooth and free from major protuberances or cavities. Following buffing some indentations or cavities resulting from prior use of the carcass 11 may still remain in its surface 12. If present, these are preferably filled, after buffing is completed, with cushion gum material 16'. When building a lugged tire from a new carcass, there of course would normally be no cavities to fill or original lugs to remove, but such tire should still be buffed sufficiently to slightly roughen its circumference and to insure that the same is substantially free from surface oxidation. While the circumference 12 of the thus-prepared new or used tire carcass 11 is substantially free from oxides, a layer 16''' of cushion gum material 16' is formed thereon and secured thereto. This is accomplished by applying suitable rubber cement, of which various satisfactory types are commercially available, to the circumferential surface 12 of tire carcass 11 which is to receive the previously prepared band of cushion gum material 16', then wrapping the band of cushion gum material about the entire circumference of the surface 12, and thereafter stitching the cushion gum material 16' to surface 12 of tire carcass 11. Carcass 11 is preferably maintained in a slightly overinflated condition while cushion gum material 16' is secured as aforesaid thereto. This helps insure that any air entrapped between cushion gum material 16' and surface 12 of carcass 11 during the cementing step will be expelled therefrom by and during stitching of the components to one another. The cushion gum layer 16''' provided upon surface 12 of carcass 11 overlies the full length and width of such surface and has a thickness of at least ⅜ to ½ inch. Layer 16''' might be formed from a single band of cushion gum material 16' possessing the requisite thickness and width, but would usually be formed by cementing and stitching a plurality of thinner and/or narrower bands to each other and/or to surface 12 of carcass 11 to form the desired layer 16'''. Whether formed from one or a plurality of bands of cushion gum material 16', layer 16''' may after its formation project beyond one or both sides of surface 12 of tire carcass 11. In such case, the layer may be trimmed along its side edge or edges to bring its width into substantial conformity with that of surface 12 or, alternatively and as is sometimes desirable when employing a used tire carcass having badly worn shoulder portions, the excess width of the cushion gum layer 16''' may be switched to such shoulder portions of the carcass.

Unless lugs 14 are to be promptly secured upon the cushion gum layer 16''' formed upon carcass 11, such layer should be covered by a removable sheet of cellophane or like material to prevent oxidation of its exposed surfaces.

Assuming that the retread rubber material 14' precured in mold 18 (FIG. 4) was formed into and allowed to remain as an elongate bar 14'', such bar is now severed intermediate its length to form discrete lugs 14 having longitudinal dimensions appropriate for their use upon the specific tire being built or rebuilt. The particular length of lugs 14 will of course vary in accordance with the width of the circumferential surface 12 of the tire carcass 11 employed, if the lugs are to extend completely across the tire as shown in FIGS. 3 and 4, and with the desire angularity (if any) of such lugs relative to the tire's axis of rotation. The bases of lugs 14 are buffed or otherwise abraded and the previously-described layers 16'' (FIG. 5) of cushion gum material 16' are cemented and stitched thereto. Following removal therefrom of any protective sheets of cellophane material (not shown) or the like thereon, the lugs 14 carrying the base cushion gum layers 16'' are then secured, in desired spaced relationship and angularity relative to each other, upon the cushion gum layer 16''' (FIG. 5) previously formed upon circumferential surface 12 of tire carcass 11. The foregoing is accomplished by cementing and stitching techniques similar to those employed to secure layer 16''' to tire carcass 11, and while such carcass is maintained in an inflated and preferably slightly overinflated condition. Performance of the foregoing assembly steps is facilitated by reason of the fact that all of the components are in an unheated condition and are preferably at a temperature no greater than the ambient temperature. If any of the components were in a heated condition during assembly, handling thereof would be more difficult and, additionally, premature partial vulcanization of the readily-curable cushion gum material 16' might undesirably occur.

Assuming that the circumferential surface of the tire carcass employed in the foregoing assembly is substantially flat, as in the case of the carcass 11 of FIGS. 2 and 3, the assembly is next placed within a suitable steam chamber (not shown) wherein it is heated under differential external-internal pressure conditions for only the period of time required to vulcanize the readily-curable cushion gum material 16' and to thereby permanently unite the components. A steam-chamber temperature and pressure of approximately 265°–280° F and approximately 80 psi effect the desired vulcanization of cushion gum material 16' without causing cracking or other deterioration of tire carcass 11, and are preferred. Automatic valving means (not shown) provided within the steam chamber and communicating with the interior of carcass 11 remove condensation therefrom and maintain a differential, preferably in the approximate range of 5 to 10 psi, between the pressure within the carcass and the steam-chamber pressure. When the steam-chamber pressure. When the steam-chamber pressure is 80 psi, the aforesaid differential may conveniently be realized by carcass 11 being inflated to such pressure when initially inserted into the steam chamber, and by then having the automatic valving means so regulated as to release air from carcass 11 when the pressure therewith tends to rise above 84–90 psi due to heating of the assembly within the chamber.

Figure 6:
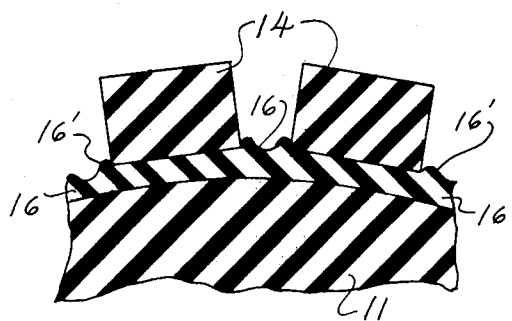
FIG. 6 is an enlarged fragmentary sectional view taken generally along the line 6—6 through the tire of FIG. 2.

The aforesaid pressure differential, in conjunction with the stitching forces previously applied to lugs 14 during their assembly with carcass 11, united the layers 16'', 16''' of cushion gum material 16' into the layer-like mass 16 as shown in the FIG. 3. As in indicated in FIG. 3, some cushion gum material 16' is squeezed or extruded outwardly from beneath each lug 14, forming rolls or beads adjacent its longitudinal edges, by the pressure-differential and stitching forces to which the lugs are subjected. However, since the combined original thicknesses of the layers 16'', 16''' beneath each lug 14 was considerably in excess of ⅜ to ½ inch, the minimum thickness of mass 16 still is no less than ⅜ to ½ inch notwithstanding the aforesaid extrusion, and the cushion gum mass normally and desirably will still be thicker (as shown in FIG. 6) in the area immediately beneath lugs 14 than in the area between the lugs.

The time required for vulcanization of cushion gum mass 16 will naturally vary to some extent with the size of the particular tire 10 being built or rebuilt, but will in any event be significantly less than the time required for vulcanization if lugs 14 were not precured and/or if mass 16 were formed or retread rubber material rather than of readily-curable cushion gum material 16'. A heating time of approximately 4 to 5 hours is normally sufficient for a tire built in accordance with the present invention, and is preferred, as compared to a heating time of 8 hours or more for lugged tires constructed in accordance with the prior art.

Referring now to FIGS. 7 and 8, the lugged tire 10' there fragmentarily shown incorporates a carcass 11' having a circumferential surface which is curved, rather than flat, in the width direction thereof. Tire 10' is constructed in the same manner as the previously described lugged tire 10, except that one or more transversly-extending grooves 26 are provided within the outer surfaces of its lug components 14 for the purpose of alleviating which might be produced within the substantially flat lugs 14 by their forced comformity to curved circumferential surface or carcass 11'. Each groove 26 may be and preferably is formed after lugs 14 have been assembled upon carcass 11', either before or after treatment of the assembly within the steam chamber, by engaging the outer surfaces of the lugs with a heated grooving iron or similar tool (not shown) of generally U-shaped configuration while rotating the tire assembly about its axis. Each groove preferably has a depth of approximately one-half inch, and its bottom surface should be rounded or arcuate to prevent stress-concentrations thereat. Although three equally-spaced grooves 26 are shown in FIGS. 7 and 8 within each lug 14, the number and spacing of the grooves may vary depending upon the degree of curvature of the circumferential surface of the tire carcass and the thickness of the lugs employed.

The lugged tire of the present invention is exceedingly durable and long-wearing. The composition and precuring, under high pressure and uniformly-applied heat, of lugs 14 causes these primary ground-engaging components of the tire to be uniformly dense and strong, and exceedingly cut and abrasion-resistant. Additionally, lugs 14 do not tend to be torn away from the tire carcass even under the impetus of the relatively high shearing forces and stresses exerted thereon during use. Such forces and stresses are believed to be dissipated in significant part by the thick cushion gum mass 16 interconnecting such lugs and the relatively-weaker tire carcass. The possibility of failure of such carcass is also minimized by the fact that the same is not subjected to excessive heating or to any detrimental deformation during building of the tire.

While preferred embodiments of the invention have been specifically shown and described, this was for purposes of illustration only, and not for purposes of limitation, the scope of the invention being in accordance with the following claims.

That which is claimed is:

1. A method of building a vehicle tire of the lugged type, comprising:
   providing a tire carcass having a substantially smooth outer circumference free from major protuberances and cavities;
   providing a plurality of lug components of generally rectangular shape, each of said lugs being formed of precured retread rubber material and having substantially uniform strength and density and high cut and abrasion resistance;
   assembling upon said outer circumference of said tire carcass said precured lugs and an intervening layer-like mass of uncured and relatively soft cushion gum material having good bonding characteristics, a rapid curing rate, and greater flexibility in both an uncured and a cured condition than said retread rubber material of said lugs; said layer-like mass of cushion gum material underlying said lugs and overlying substantially all of said circumference of said tire carcass and having a minimum thickness of at least approximately ⅜ to ½ inch;
   and thereafter heating the assembled cushion gum material, precured lugs and tire carcass while imposing a differential external-internal pressure thereon, within a steam chamber to cure said cushion gum material and permanently bond together all of said components of the assembly.

2. A method as in claim 1, wherein said assembling step includes securing layers of cushion gum material to said outer circumference of said tire carcass and to the bases of said lug components, and thereafter securing said lug components with base layers of cushion gum material thereon to the layer of cushion gum material upon said outer circumference of said tire carcass.

3. A method as in claim 2, wherein said cushion gum layer secured to said circumference of said tire carcass has a minimum thickness of at least approximately three-eights to one-half inch and overlies substantially all of said tire carcass circumference.

4. A method as in claim 3, wherein said cushion gum layers secured to said bases of said precured lugs each have a thickness of at least approximately three-thirty-seconds inch.

5. A method as in claim 4, and further including removing surface oxide from said circumferential surface of said tire carcass and from said bases of said precured lugs immediately prior to securing said cushion gum material thereto.

6. A method as in claim 2, wherein said assembling comprises cementing and stitching said tire carcass, cushion gum material and precured lugs together while said components are in an unheated condition.

7. A method as in claim 1, wherein the step of providing a tire carcass having a substantially smooth circumference includes providing a used lugged tire and buffing the circumference thereof to remove therefrom deteriorated surface rubber and remnants of the original lugs thereon.

8. A method as in claim 1, and further including providing stress-relieving grooves within the outer surface of said precured lugs.

9. A method as in claim 8, wherein said grooves are provided within said lugs subsequent to said assembling step.

10. A method as in claim 9, wherein said grooves are formed by rotating said assembly about its axis while engaging the outer surfaces of said precured lugs thereon with a heated groove-forming tool.

11. A method as in claim 10, wherein said grooves have a depth of at least approximately ½ inch and each have an innermost surface of arcuate configuration.

12. A method as in claim 1, wherein the step of providing precured lugs includes placing uncured retread rubber material within a mold, subjecting the uncured rubber material within the mold to heat and pressure to simultaneously cure said rubber material and mold the same into an elongate bar having substantially the desired cross-sectional configuration of said lug components, and thereafter severing said elongate bar at spaced intervals intermediate its length to provide said lugs.

13. A method as in claim 12, wherein said retread rubber material is subjected within said mold to a pressure within the approximate range of 700 psi to 800 psi, and to a heating temperature in the approximate range of 300°–400° F, and wherein the heat is applied to said retread rubber material within said mold through more than one face thereof.

14. A method as in claim 12, including buffing the bases of said precured lugs, and securing layers of said cushion gum material upon the base of said precured lugs promptly after buffing thereof.

15. A method as in claim 11, including maintaining said tire carcass in an inflated condition during said assembling step.

16. A method as in claim 1, wherein said pressure differential maintained during heating of said assembly is at least approximately five psi.

17. A method as in claim 1, wherein during heating of said assembly the internal pressure within said tire carcass is raised to and maintained at approximately 5 to 10 psi more than the steam pressure within said chamber.

18. A method as in claim 17, wherein during heating of said assembly the internal pressure within said tire carcass is raised to and maintained at approximately 85–90 psi while the steam pressure within said chamber is raised to and maintained at approximately 80 psi.

19. A method as in claim 1, wherein said assembly is heated within said chamber at a temperature of approximately 265°–280° F for a time of no more than approximately 5 to 6 hours.

* * * * *

UNITED STATES PATENT AND TRADEMARK OFFICE
CERTIFICATE OF CORRECTION

PATENT NO. : 3,993,521
DATED : 23 November 1976
INVENTOR(S) : Albert A. Harrelson, Jr.

It is certified that error appears in the above-identified patent and that said Letters Patent are hereby corrected as shown below:

Col.1, line 22, "extrememly" should read -- extremely --.
Col.2, line 58, "vided one" should read -- vided with one --.
Col. 3, line 35, "strong wear" should read -- strong and wear --.
Col. 4, line 64, "fomred" should read -- formed --.
Col.5, line 5, "one" should read -- use --; line 19, "grade quality" should read -- grade and quality --; line 49, "an dremoved" should read -- and removed --; line 57, "20°" should read -- 20' --; line 57, "20-" should read -- 20'--.
Col.6, line 3, "is" should read -- in --; line 8, "range 700" should read -- range of 700 --; lines 26 & 27, "elongate bar 14" pressure and uniformly applied heat, the elongate heat 14" possesses a more uniform density" should read -- elongate bar 14" possesses a more uniform density --; line 64, "layer (Fig. 5)" should read -- layer 16" (Fig. 5) --; line 66, "3/32 inch" should read -- 3/32 of an inch --.
Col.7, line 56, "switched" should read -- stitched --.
Col.8, lines 47 & 48, "the carcass and the steam-chamber pressure. When the steam-chamber pressure. When the steam-chamber" should read -- the carcass and the steam-chamber pressure. When the steam-chamber --; line 54, "84" should read -- 85 --; line 58, "united" should read -- unite --.
Col. 9, line 4, "area" should read -- areas --; line 10, "or" should read -- of --; line 25, "alleviating which" should read -- alleviating stresses which --; line 26, "comformity to" should read -- conformity to the --; line 27, "or" should read -- of --.
Col. 12, line 3, "11" should read -- 1 --.

Signed and Sealed this

Fifteenth Day of March 1977

[SEAL]

Attest:

RUTH C. MASON
Attesting Officer

C. MARSHALL DANN
Commissioner of Patents and Trademarks